United States Patent [19]

Bader

[11] Patent Number: 4,599,848

[45] Date of Patent: Jul. 15, 1986

[54] MOLDED CLIP REORIENTER AND APPLICATOR

[75] Inventor: James S. Bader, Lakewood, Colo.

[73] Assignee: Adolph Coors Company, Golden, Colo.

[21] Appl. No.: 602,502

[22] Filed: Apr. 20, 1984

[51] Int. Cl.[4] .................. B65B 27/04; B65B 35/58
[52] U.S. Cl. ..................... 53/398; 53/48; 53/448;
53/543; 198/345; 198/462
[58] Field of Search ............... 53/48, 128, 134, 367,
53/398, 410, 413, 448, 543; 198/345, 462;
221/240, 261, 277, 312 A

[56] References Cited

U.S. PATENT DOCUMENTS

| 2,909,876 | 10/1959 | McGihon | 53/48 X |
|---|---|---|---|
| 3,096,575 | 7/1963 | Cook | 53/48 X |
| 3,267,638 | 8/1966 | Earp | 53/48 |
| 3,332,210 | 7/1967 | Tordi | 221/277 X |
| 3,336,723 | 8/1967 | De Shazor | 53/48 X |
| 3,541,751 | 11/1970 | Quebe et al. | 53/48 X |
| 4,501,104 | 2/1985 | Griffin et al. | 53/48 |

FOREIGN PATENT DOCUMENTS 197709 9/1977 U.S.S.R. ................. 53/313

Primary Examiner—E. R. Kazenske
Assistant Examiner—Michael D. Folkerts
Attorney, Agent, or Firm—Klaas & Law

[57] ABSTRACT

A device for applying molded plastic clips to unattached containers to form multiple container packages which includes a container alignment device for aligning the unattached containers for application of the clips by generating uniform forces between the unattached containers during the application of the clips. This is accomplished by a series of star wheels that generate a predetermined downstream force and a predetermined upstream force by adjusting the predetermined phase angle between the star wheel means. This results in a substantially zero resultant force which ensures uniform expansion and precise alignment of the containers during application of the clips. Also disclosed is a clip orienting device for reorienting plastic molded clips from a transverse cross configuration to a longitudinal cross configuration which includes an alignment guide device for transporting clips in a transverse cross configuration, a retaining device for releasably retaining the clips in the alignment guide, such that the clips can be removed from the alignment guide at a predetermined angle, a clip removal device for sequentially displacing the clips from the retaining device at the predetermined angle, and an alignment track means disposed to engage the clips upon displacement from the retaining device at the predetermined angle such that the clips are disposed in the alignment track means in a longitudinal cross configuration.

17 Claims, 7 Drawing Figures

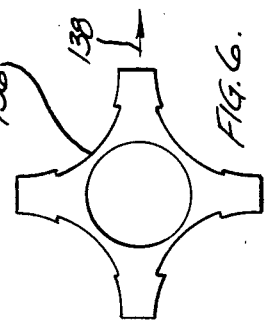
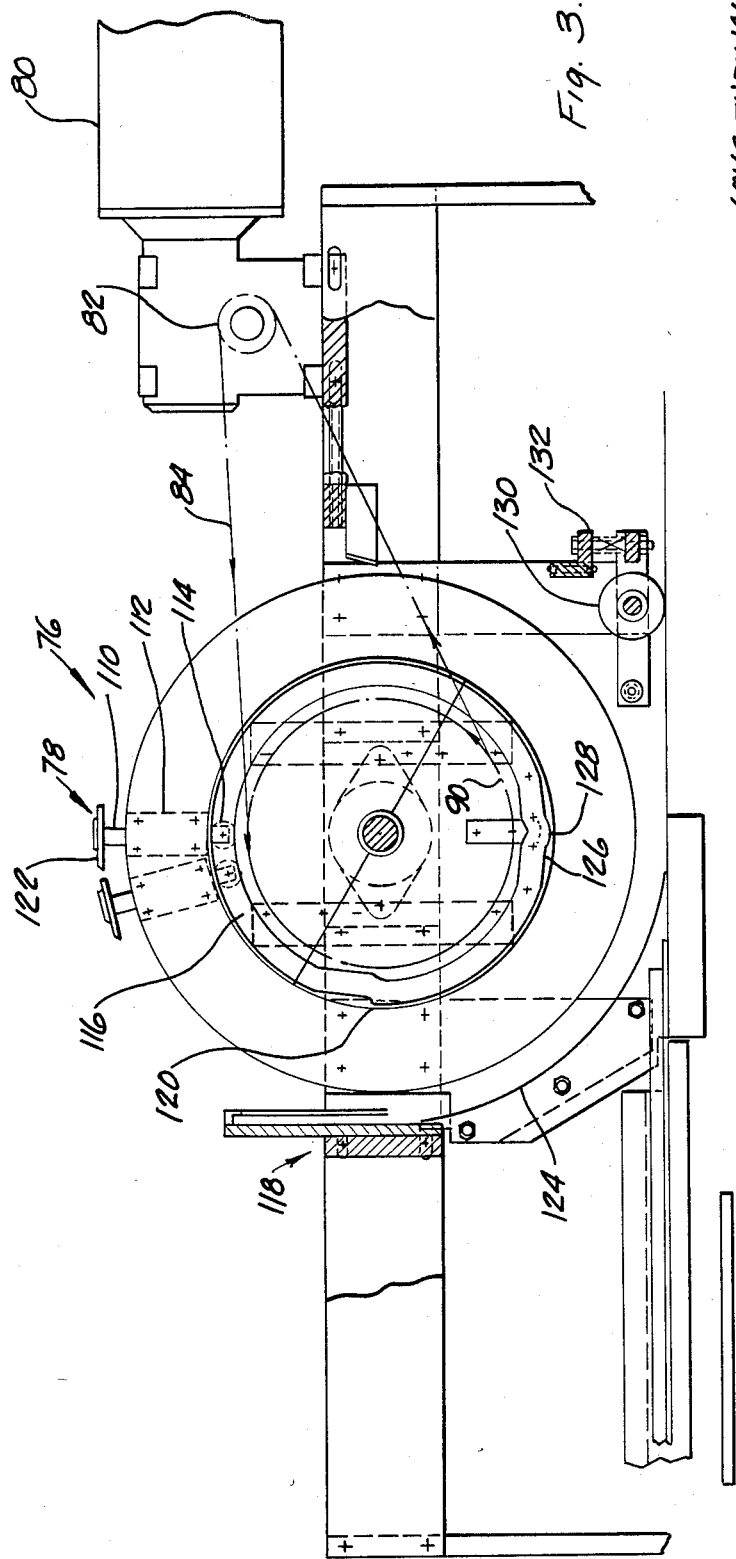

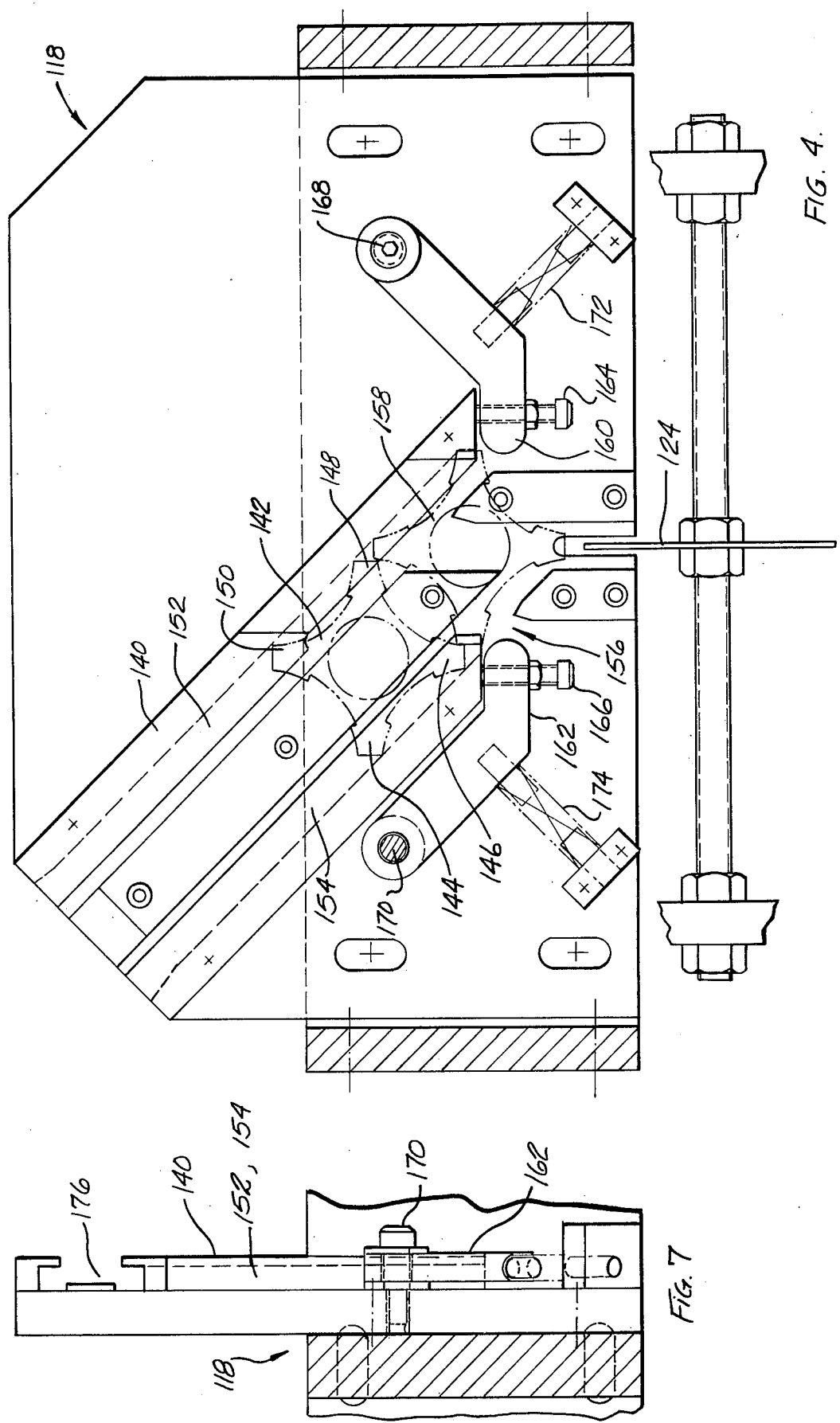

MOLDED CLIP REORIENTER AND APPLICATOR

BACKGROUND OF THE INVENTION

This invention relates generally to systems for forming multiple container packages and more particularly to apparatus and methods for applying molded clips to unattached containers and devices and methods for reorienting plastic molded clips and aligning unattached containers.

Retaining clips of the type used by the present invention are disclosed in U.S. Pat. No. 4,216,859 by James S. Bader et al. for Can Clip and Packages, U.S. patent application Ser. No. 501,008 U.S. Pat. No. 4,548,021 of James S. Bader et al., filed June 3, 1983, for Machine and Method for Assembly of Multiple Container Packages, U.S. patent application Ser. No. 524,129, U.S. Pat. No. 4,552,265, filed Aug. 17, 1983, for Improved Can Clip and Multiple Container Package by James S. Bader, the disclosures of which are hereby specifically incorporated by reference for all that they disclose.

SUMMARY OF THE INVENTION

In general, the present invention comprises a device for reorienting plastic molded clips from a transverse cross configuration to a longitudinal cross configuration comprising alignment guide means for transporting the clips in the transverse cross configuration; retaining means for releasably retaining the clips in the alignment guide means such that the clips can be removed from said alignment guide means at a predetermined angle; clip removal means for sequentially displacing the clips from the retaining means at the predetermined angle; alignment track means disposed to engage the clips upon displacement from the retaining means at the predetermined angle such that the clips are disposed in the alignment track means in a longitudinal cross configuration.

The present invention may also comprise a device for aligning a plurality of unattached containers for application of molded clips to form multiple container packages by generating uniform forces between the unattached containers during application of the clips comprising metering star wheel means for eliminating line pressure on the containers downstream from the metering star wheel means; locating star wheel means for generating a predetermined forward force on the containers disposed between the locating star wheel means and the metering star wheel means by providing a first predetermined phase angle between the metering star wheel means and the locating star wheel means; regulating star wheel means for generating a predetermined reverse force on the containers disposed between the locating star wheel means and the regulating star wheel means which is substantially equal to the predetermined forward force by providing a second predetermined phase angle between the regulating star wheel means and the locating star wheel means; clip applicator means for applying the clips to the containers at a location at which the predetermined forward force and the predetermined reverse force produce a substantially zero resultant force to ensure uniform expansion and precise alignment of the containers during application of the clips.

The advantages of the present invention are that a device is provided for reorienting plastic molded clips from a transverse cross configuration to a longitudinal cross configuration without changing the direction of movement of the clip and thereby substantially reducing the likelihood of jamming of the clips in the reorienting device. The present invention also provides device for aligning a plurality of unattached containers for application of molded clips by generating uniform forces between unattached containers during application of the clips to ensure that the clips are properly applied to the unattached containers as a result of uniform expansion and precise alignment of the containers. This can be achieved in a simple and inexpensive manner in a device which is reliable in operation.

OBJECTS OF THE INVENTION

It is therefore an object of the present invention to provide device for reorienting plastic molded clips from a transverse cross configuration to a longitudinal cross configuration.

Another object of the present invention is to provide a device for reorienting plastic molded clips from a transverse cross configuration to a longitudinal cross configuration which is reliable in operation.

It is also an object of the present invention to provide a device for aligning a plurality of unattached containers for application of molded clips to form multiple container packages.

Another object of the present invention is to provide a device for aligning a plurality of unattached containers for application of molded clips to form multiple container packages by generating uniform forces between said unattached containers during application of said clips.

Additional objects, advantages, and novel features of the invention are set forth in part in the description which follows and will be understood by those skilled in the art upon examination of the following or may be learned by practice of the invention. The objects and advantages of the invention may be realized and obtained by means of the instrumentalities and combinations particularly pointed out in the appended claims.

BRIEF DESCRIPTION OF THE DRAWINGS

An illustrative and presently preferred embodiment of the invention is shown in the accompanying drawings wherein:

FIG. 3 is a side view of the clip applicator wheel.

FIG. 4 is a side view of the clip reorienting device of the present invention.

FIG. 5 is a top view of a clip disposed in a transverse cross configuration.

FIG. 6 is a top view of a clip disposed in a longitudinal cross configuration.

FIG. 7 is an end view of the device illustrated in FIG. 4.

DETAILED DESCRIPTION OF THE INVENTION

Figure 1:
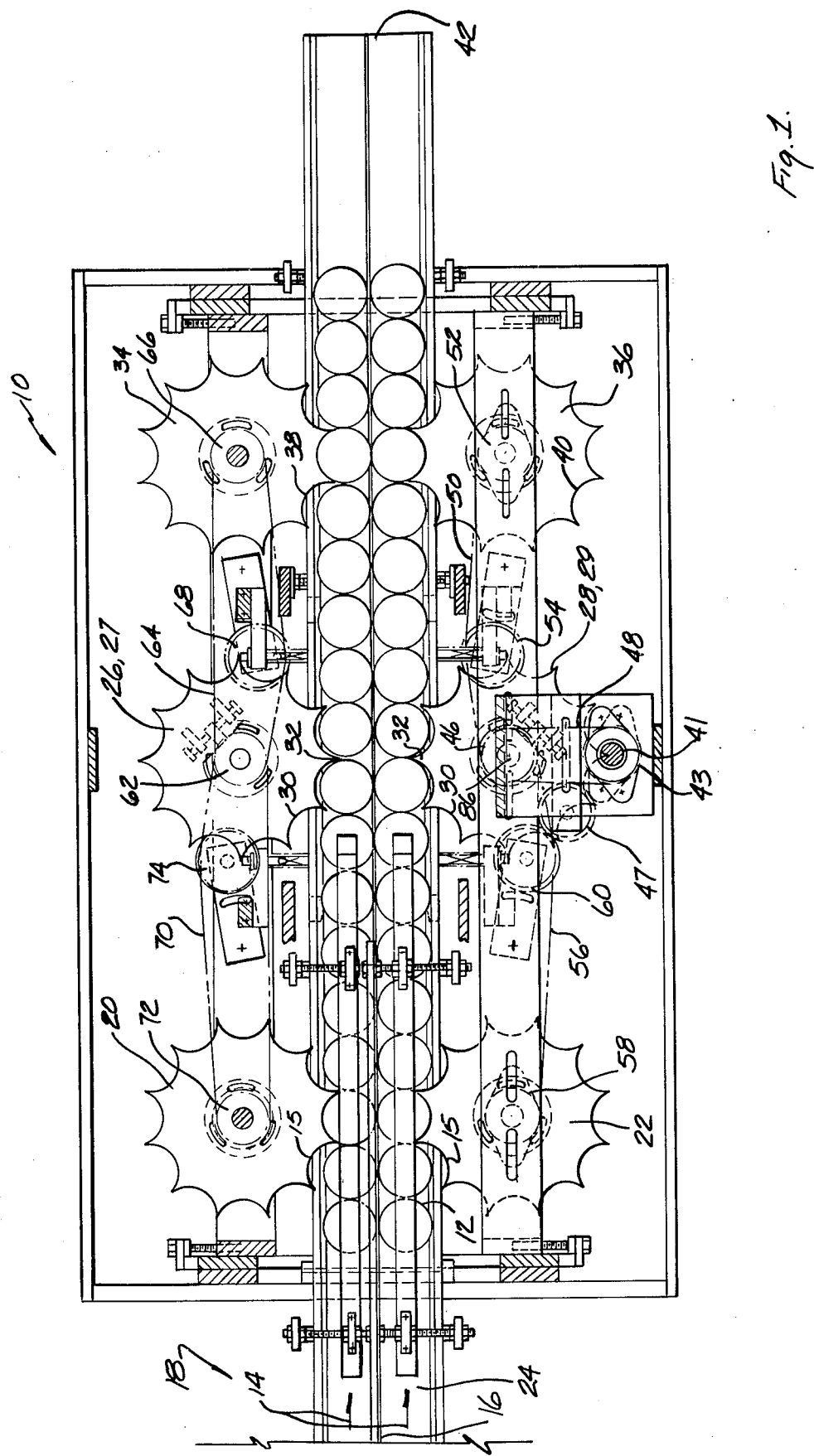
FIG. 1 is a top view of device for aligning a plurality of unattached containers.

FIG. 1 is a top view of the clip applicator device 10 of the present invention. Pairs of unattached containers 12 enter from the left side of FIG. 1 as indicated by arrows 14. Transverse spacing means 16 comprises a plate divider which provides a predetermined spacing of approximately 1/16" between each of the pairs of containers 12 in a direction transverse to the direction which the cans proceed in can track 18. The predetermined spacing of 1/16" is suitable for application of clips. As pairs of unattached containers 12 proceed downstream along can track 18, metering star wheel means 20, 22 engage the unattached containers. Line pressure developed by cans upstream from metering star wheel means 20, 22 causes unattached containers 12 to engage metering star wheel means 20, 22. Metering star wheel means 20, 22 function to eliminate line pressure on containers downstream from metering star wheel 20, 22, i.e., to the right of metering star wheel means 20, 22, as illustrated in FIG. 1. Can track 18 has a plate top chain conveyor 24 which functions to advance containers 12 in the direction indicated to produce the upstream line pressure which is eliminated by metering star wheel means 20, 22.

Containers 12, which are located downstream from metering star wheel means 20, 22, are engaged by locating star wheel means 26, 27, 28, 29. Locating star wheel means 26, 27, 28, 29 engage the containers 12 at a predetermined phase angle with respect to locating star wheel means 20, 22. This produces a predetermined force on containers 12 located between the metering star wheel means 20, 22 and locating star wheel means 26, 27, 28, 29 in a forward direction, i.e., the direction indicated by arrows 14. This predetermined forward force is produced by the pressure generated between the cans as a result of the phase difference between metering star wheel means 20, 22 and locating star wheel means 26, 27, 28, 29. The predetermined forward force is precisely controlled by the first predetermined phase angle established between metering star wheel means 20, 22 and locating star wheel means 26, 27, 28, 29. Locating star wheel means 26, 27, 28, 29 have a plurality of container pockets 30 similar to container pockets 15 in metering star wheel means 20, 22 which function to hold the containers against transverse spacing means 16. Additionally, pointed portions 32 of locating star wheel means 26, 27, 28 29 function as longitudinal spacing means for providing a predetermined longitudinal spacing between containers which is suitable for application of molded clips.

The spacing of locating star wheel means 26, 27, 28, 29 from transverse spacing means 16 produces a predetermined transverse force on containers 12 which is suitable for application of molded clips.

Figure 2:
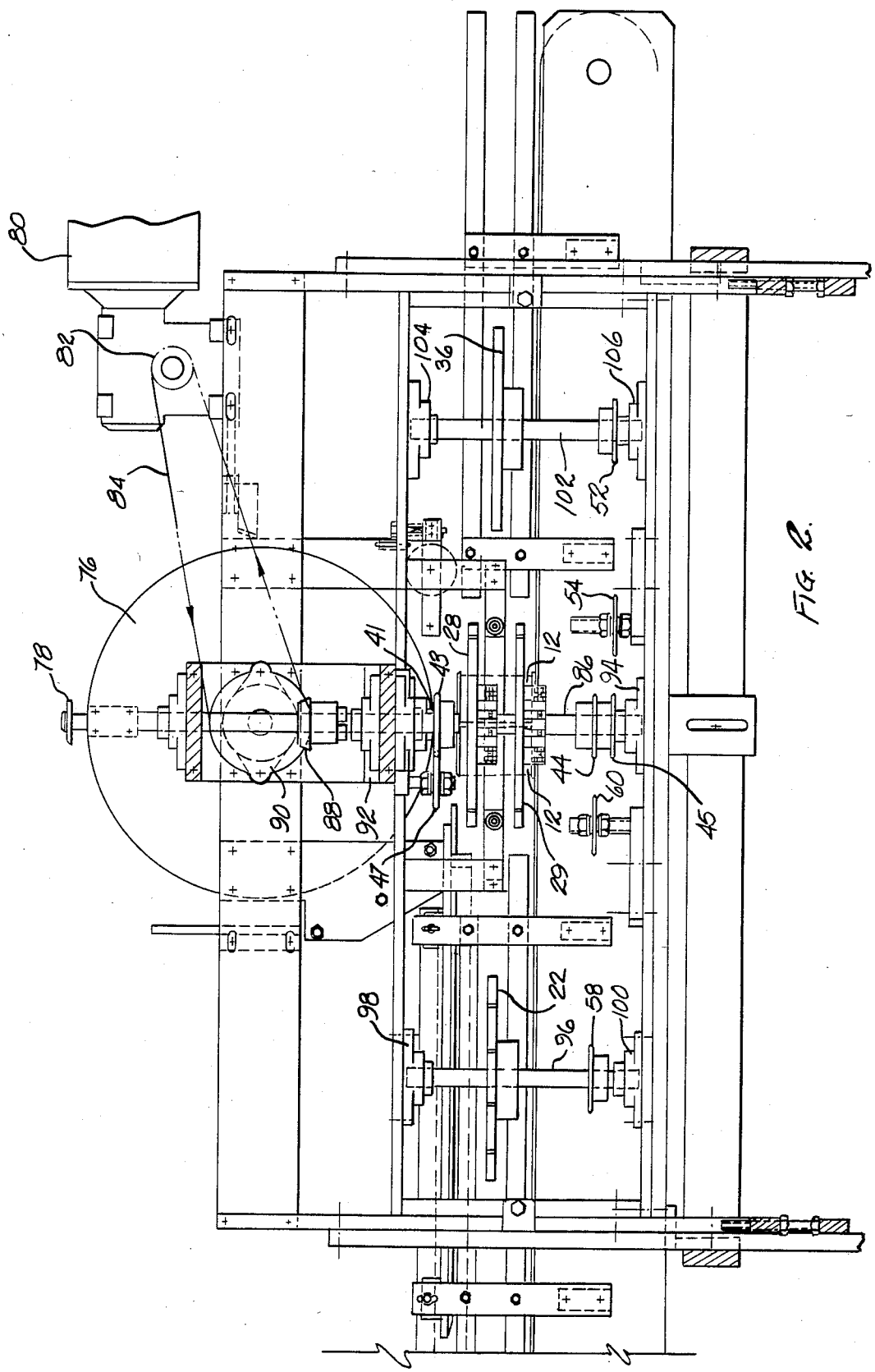
FIG. 2 is a side view of the device illustrated in FIG. 1.

After containers 12 leave locating star wheel means 26, 27, 28, 29 they are transported in a forward direction along conveyor 24 to regulating star wheel means 34, 36. Regulating star wheel means 34, 36 engage containers 12 in pockets 38, 40. Regulating star wheel means have a second predetermined phase angle with respect to locating star wheel means 26, 27, 28, 29 which produces a predetermined force in a reverse direction, i.e., in a direction reverse to that of the direction of travel of the containers 12, as indicated by arrows 14. In other words, a predetermined reverse force is produced along the centerline of containers 12 in a direction from regulating star wheel means 34, 36 toward locating star wheel means 26, 27, 28, 29. This predetermined reverse force is precisely regulated by the predetermined phase angle between regulating star wheel means and locating star wheel means such that the predetermined reverse force is substantially equal to the predetermined forward force. As a result of the predetermined forward force and the predetermined reverse force being substantially equal, a substantially zero resultant force is produced at an application location proximate to the centerline between locating star wheel means 26, 27, 28, 29. The clip applicator device of the present invention, as illustrated in FIGS. 2 and 3, applies molded clips to form multiple container packages at the application location where the zero resultant force is produced on containers 12 to ensure uniform expansion and precise alignment of the containers during application of the clips. The multiple container packages which proceed from regulating star wheel means 34, 36 in a forward direction are conveyed by plate top chain conveyor 24 to a point 42 where the containers exit the clip applicator machine.

Synchronization of the metering star wheel means 20, 22, locating star wheel means 26, 27, 28, 29 and regulating star wheel means 34, 36 is accomplished through the use of chain drives. Drive sprocket 43 receives power from drive shaft 41 and drives locating star wheel means sprocket 46 by chain 48, which in turn drives locating star wheel shaft 86 and star wheel means 28, 29. Tensioner sprocket 47 provides tension to drive chain 48. Locating star wheel shaft 86 is coupled to drive sprockets 44, 45, as illustrated in FIG. 2. Chain 50 receives power from drive sprocket 45 to drive regulating star wheel sprocket 52. Idler sprocket 54 functions as a chain tensioner to increase operational tolerances between locating star wheel means 28, 29 and regulating star wheel means 36.

In a similar manner, chain 56 receives power from sprocket 44 which is used to drive metering star wheel sprocket 58. Idler sprocket 60 functions as a chain tensioner to increase tolerances of operation between metering star wheel means 22 and locating star wheel means 28, 29. Additionally, locating star wheel sprocket 62, which is connected directly to locating star wheel means 26, 27, receives power from a drive sprocket similar to drive sprocket 43.

Chains 64, 70 receive power from drive sprockets similar to drive sprockets 44, 45 to drive regulating star wheel sprocket 66 and metering star wheel sprocket 72, respectively. Chain tensioners 68, 74 provide tension to chains 64, 70, respectively.

FIG. 2 is an elevation view of the device illustrated in FIG. 1. As illustrated in FIG. 2, clip applicator wheel 76 has a plurality of clip applicator heads 78 which function to remove clips from a clip reorienting device and apply the clips to the containers to form multiple container packages. Clip applicator wheel 76 rotates in a counter-clockwise direction, as illustrated in FIG. 2, in response to power received from drive motor 80 via drive sprocket 82 and chain 84. Power is transferred to vertical drive shaft 86 by way of bevel gears 88, 90. Vertical drive shaft 86 transfers power to drive sprockets 44, 45. Vertical drive shaft 86 is mounted in bearings 92, 94. Drive sprocket 44 drives metering star wheel sprocket 58 via chain 56. Drive sprocket 45 drives regulating star wheel sprocket 52 via chain 50. Metering star wheel shaft 96 is mounted in bearing 98, 100. Metering star wheel shaft 96 is adjustably attached to metering star wheel means 22. Regulating star wheel sprocket 52 is fixedly attached to regulating star shaft 102. Regulating star wheel shaft 102 is mounted in bearings 104, 106. Regulating star wheel means 36 is adjustably attached to regulating star wheel shaft 102. Locating star wheel means 28, 29 are adjustably attached to locating star wheel shaft 86. Drive sprocket 43 is fixedly attached to shaft 41 and drives sprocket 46 via chain 48. Idler sprocket 47 functions as a chain tensioner for chain 48.

FIG. 3 is an elevation view of clip applicator wheel 76 and its associated structure. Clip applicator wheel 76 has a plurality of clip applicator devices 78 mounted along the periphery of the clip applicator wheel 76. Clip applicator devices 78 are attached to the movable shaft 110 which is mounted in stationary housing 112. Movable shaft 110 is attached to cam follower 114 which follows cam 116 around applicator wheel 76 in a counter-clockwise direction. The configuration of cam 116 causes applicator devices 78 to move in and out in a radial direction in accordance with the position of clip applicator devices 78 around the applicator wheel 76. Power to drive applicator wheel 76 is supplied from motor 80 via drive sprocket 82 and chain 84. Chain 84 is coupled to applicator wheel sprocket 90 to cause the applicator wheel 76 to rotate in a counter-clockwise direction.

The configuration of cam 116 causes clip applicator devices 78 to retract when approaching clip reorienting device 118. Raised portion 120 of cam 116 causes clip applicator heads 122 to be inserted in a clip disposed for removal from clip reorienting device 118. Cam 116 then maintains the clip on guide track 124 until the clip applicator device 78 reaches a vertical position. Recessed portion 126 and protrusion 128 cause the clip to be retracted and then applied to a group of four containers 12. Pressure roller 130 ensures that the clips are fully applied to containers 12. Pressure applied by pressure roller 130 is set by adjustment means 132.

FIG. 4 illustrates clip reorienting device 118 of the present invention. Clip reorienting device 118 functions to reorient molded plastic clips from a transverse cross configuration to a longitudinal cross configuration.

FIG. 5 illustrates a molded clip disposed in a transverse cross configuration 134 relative to the direction of movement 138 of the clip.

FIG. 6 illustrates a molded clip having a longitudinal cross configuration 136 relative to the direction of movement 138 of the clip. Clips received from the bulk orienter disclosed in U.S. patent application Ser. No. 501,008, filed June 3, 1983, are disposed in a transverse cross configuration, such as illustrated in FIG. 5. The clip applicator device 76, illustrated in FIG. 3, must receive the molded clip in a longitudinal cross configuration to properly apply the molded clip to the containers 12. Consequently, a reorienting device is required which changes the clip from a transverse cross configuration 134 to a longitudinal cross configuration 136.

Reorientation from a transverse cross configuration 134 to a longitudinal cross configuration 136 is accomplished by reorienting device 118, as illustrated in FIGS. 4 and 7. Clip chute 140 receives clips in a transverse cross configuration from the bulk orienter. Clip 142 is shown disposed in a transverse cross configuration with ear portions 144, 146, 148, 150 disposed in tracks 152, 154 which function to guide the clip 142 in the clip chute 140 in a transverse cross configuration. Tracks 152, 154 function as alignment guide means for transporting the clips in a transverse cross configuration. Clip chute 140 is disposed at a predetermined angle of approximately 45 degrees from the vertical. A horizontal opening 156 is provided in clip chute 140 which allows clips, such as clip 158 to be removed from clip chute 140 in a vertical direction.

Retaining means 160, 162 releasably retain clip 158 in clip chute 140 such that clip 158 can be removed in the vertical direction at a 45 degree angle from clip chute 140. Since the transverse cross configuration 134 illustrated in FIG. 5 and the longitudinal cross configuration 136 illustrated in FIG. 6 differ by 45 degrees, removal of clip 158 from clip chute 140 at a 45 degree angle causes the clip to be reoriented from a transverse cross configuration 134 to a longitudinal configuration 136. Adjustment means 164, 166 allow precise adjustment of clip 158 by adjusting the position of the abutting surfaces of retaining means 160, 162, such that the clip 158 is aligned with guide track 124. A slot formed in clip 158 engages guide track 124 to ensure proper alignment of clip 158 upon removal from clip chute 140. Clip applicator 78 removes clips from the position illustrated by clip 158 causing retaining means 160, 162 to pivot about points 168, 170 and deflect against the force produced by retaining springs 172, 174. The force produced by springs 172, 174 is substantially equal such that minimal rotation of clip 158 occurs prior to engagement with guide track 124. Clip applicator head 122 (FIG. 3) sequentially removes clips from the position of clip 158. Gravity causes clips in position 142 to be sequentially displaced into the position of clip 158.

FIG. 7 is a side view of reorienting device 118. As illustrated in FIG. 7, clip chute 140 has an opening 176 which receives molded clips from the bulk orienting device disclosed in the above-identified application. Molded clips proceed down tracks 152, 154 for removal from clip chute 140. Retaining means 162 pivots around the axis of threaded shaft 170.

The present invention therefore provides both a device for reorienting plastic molded clips from a transverse cross configuration to a longitudinal cross configuration and a device for aligning a plurality of unattached containers for application of molded clips to form multiple container packages by generating uniform forces between the unattached containers during application of the clips. The reorienting device of the present invention does not cause a change of direction of the molded clip within the reorienting device so as to reduce the possibility of jamming of clips. The reorienting device is disposed at a predetermined angle so the clips moving in a transverse cross configuration within the reorienting device can be removed in a longitudinal cross configuration. The device for aligning a plurality of unattached containers for application of molded clips produces a predetermined forward force and a predetermined reverse force on the containers which are substantially equal so as to produce a substantially zero resultant force at a predetermined location to ensure uniform expansion and precise alignment of the containers during application of the clips. This is accomplished by adjusting the phase angle between three sets of star wheel means. This produces an inexpensive and reliable method of aligning unattached containers for application of molded clips.

The foregoing description of the invention has been presented for purposes of illustration and description. It is not to be intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated.

It is intended that the appended claims be construed to include other alternative embodiments of the invention except insofar as limited by the prior art.

What is claimed is:

1. A method of aligning a plurality of unattached containers for application of molded clips to form multiple container packages by generating uniform forces between said unattached containers during application of said clips comprising the steps of:

eliminating line pressure on said containers by metering the flow of containers at a first predetermined location;

generating a predetermined forward force on said containers between said first predetermined location and a second predetermined location;

generating a predetermined reverse force on said containers between said second predetermined location and a third predetermined location such that said predetermined forward force and said predetermined reverse force produce a resultant force which is substantially zero at said second predetermined location;

applying said molded clips to said containers at said second predetermined location to ensure uniform expansion and precise alignment of said containers during application of said clips as a result of said substantially uniform forces produced at said second predetermined location.

2. The method of claim 1 wherein said step of eliminating line pressure comprises:

providing metering star wheel means to impede and meter the flow at said containers.

3. The method of claim 2 wherein said step of generating a predetermined forward force comprises:

providing locating star wheel means for controlling movement of said containers to generate said predetermined forward force by providing a first predetermined phase angle between said metering star wheel means and said locating star wheel means.

4. The method of claim 3 wherein said step of generating a predetermined reverse force comprises:

providing spacing star wheel means for controlling movement of said containers to generate said predetermined reverse force by providing a second predetermined phase angle between said spacing star wheel means and said locating star wheel means.

5. A device for aligning a plurality of unattached containers for application of molded clips to form multiple container packages by generating uniform forces between said unattached containers comprising:

metering star wheel means for eliminating line pressure on said containers downstream from said metering star wheel means;

locating star wheel means for generating a predetermined forward force on said containers disposed between said locating star wheel means and said metering star wheel means by providing a first predetermined phase angle between said metering star wheel means and said locating star wheel means;

regulating star wheel means for generating a predetermined reverse force on said containers disposed between said locating star wheel means and said regulating star wheel means which is substantially equal to said predetermined forward force by providing a second predetermined phase angle between said regulating star wheel means and said locating star wheel means;

clip applicator means for applying said clips to said containers at a location at which said predetermined forward force and said predetermined reverse force produce a substantially zero resultant force to ensure uniform expansion and precise alignment of said containers during application of said clips.

6. The device of claim 5 further comprising:

transverse spacing means for providing a predetermined transverse spacing between said containers suitable for application of said clips.

7. The device of claim 6 wherein said locating star wheel means comprises:

longitudinal spacing means for providing a predetermined longitudinal spacing between said containers suitable for application of said clips.

8. The device of claim 7 further comprising:

roller means for providing an interference fit between said clips and said containers to ensure full application of said clips to said containers.

9. In a device for applying plastic molded clips to unattached containers to form multiple container packages, the combination comprising:

container alignment means for aligning said unattached containers for application of said clips by generating uniform forces between said unattached containers during application of said clips said alignment means comprising:

metering star wheel means for eliminating line pressure on said containers downstream from said metering star wheel means;

locating star wheel means for generating a predetermined forward force on said containers disposed between said locating star wheel means and said metering star wheel means by providing a first predetermined phase angle between said metering star wheel means and said locating star wheel means;

spacing star wheel means for generating a predetermined reverse force on said containers disposed between said locating star wheel means and said spacing star wheel means which is substantially equal to said predetermined forward force by providing a second predetermined phase angle between said spacing star wheel means and said locating star wheel means;

clip applicator means for applying said clips to said containers at a location at which said predetermined forward force and said predetermined reverse force produce a substantially zero resultant force to ensure uniform expansion and precise alignment of said containers during application of said clips;

clip orienting means for reorienting said plastic molded clips from a transverse cross configuration to a longitudinal cross configuration, said clip orienting means comprising:

alignment guide means for transporting said clips in said transverse cross configuration;

retaining means for releasably retaining said clips in said alignment guide means such that said clips can be removed from said alignment guide means at a predetermined angle;

clip removal means for sequentially displacing said clips from said retaining means at said predetermined angle;

alignment track means disposed to engage said clips upon displacement from said retaining means at said predetermined angle such that said clips are disposed in said alignment track means in a longitudinal cross configuration.

10. The device of claim 9 wherein said retaining means comprises:

spring loaded holder means for holding said clips in said alignment guide means to produce substantially equal forces on opposing arm portions of said clips during removal at said clips from said alignment guide means at said predetermined angle to ensure engagement of said clips means with said alignment track means.

11. The device of claim 10 wherein said spring loaded holder means comprises:

abutting surface means for retaining said clips;

holder adjustment means for aligning said clips with said alignment track means.

12. The device of claim 9 wherein said alignment guide means has end portions adjacent said abutting surface means of said spring loaded surface which form an angle with said alignment guide means which is equal to said predetermined angle such that said clips are exposed from said alignment guide means in said longitudinal cross configuration.

13. The device of claim 9 further comprising:

adjustment means for adjusting the position of said retaining means to ensure engagement of said clip means with said alignment track means.

14. The device of claim 9 wherein said alignment guide means comprises:

groove means for aligning said clips in said transverse cross configuration by retaining ear portions of said clips in substantially parallel opposing grooves.

15. The device of claim 9 further comprising:

transverse spacing means for providing a predetermined transverse spacing between said containers suitable for application of said clips.

16. The device of claim 15 wherein said locating star wheel means comprises:

longitudinal spacing means for providing a predetermined longitudinal spacing between said containers suitable for application of said clips.

17. The device of claim 16 further comprising:

roller means for providing an interference fit between said clips and said containers to ensure full application of said clips to said containers.

* * * * *